United States Patent [19]

Johnsen

[11] 4,426,256

[45] Jan. 17, 1984

[54] APPARATUS FOR TREATING FIBROUS MATERIAL WITH A GAS

[75] Inventor: Øystein Johnsen, Oslo, Norway

[73] Assignee: Myrens Verksted A/S, Oslo, Norway

[21] Appl. No.: 356,465

[22] Filed: Mar. 9, 1982

[51] Int. Cl.³ .................. D21C 7/06; D21C 7/08; D21C 9/10
[52] U.S. Cl. .................... 162/237; 162/65; 162/243; 162/246; 34/171
[58] Field of Search ............. 162/57, 63, 64, 65, 162/66, 67, 234, 235, 236, 237, 243, 246; 34/217, 211, 171; 68/181 R

[56] References Cited

U.S. PATENT DOCUMENTS

| | | | |
|---|---|---|---|
| 1,871,773 | 8/1932 | Bennett | 34/171 |
| 2,425,335 | 8/1947 | Messing et al. | 162/237 |
| 3,726,756 | 4/1973 | Polak | 162/63 |
| 3,814,664 | 6/1974 | Carlsmith . | |
| 4,123,317 | 10/1978 | Fritzvold et al. | 162/65 |
| 4,253,825 | 3/1981 | Fasano | 34/217 |
| 4,278,496 | 7/1981 | Fritzvold . | |

FOREIGN PATENT DOCUMENTS 124892 6/1972 Norway .
69893 5/1929 Sweden .

Primary Examiner—Steve Alvo
Attorney, Agent, or Firm—Cushman, Darby & Cushman

[57] ABSTRACT

A method and apparatus provide for the continuous treatment of a porous, fibrous material such as paper pulp, with a gas, such as ozone. The material is entrained with gas and passed in a first path. The material and gas move in a path defined by a downwardly curved upper wall and an open bottom, with a baffle disposed adjacent the bottom termination of the downwardly curved wall, so that the material is separated from the gas, the material flowing in a second path and the gas in a third path, distinct from the second path. The material in the second path is moved so that it intersects the flow of gas in the third path at least once, with the gas passing through the material while remaining in the third path, until the desired treatment of the material has been achieved. Preferably the second path is a serpentine path including horizontal portions, and the third path is a substantially straight downward path. After treatment, the material is discharged in a fourth path, and the gas passes along a fifth path.

9 Claims, 4 Drawing Figures

APPARATUS FOR TREATING FIBROUS MATERIAL WITH A GAS

BACKGROUND AND SUMMARY OF THE INVENTION

In the treatment of porous, fibrous material with gas it is desirable to minimize the consumption of gas while at the same time providing optimum intermixing of, and contact between, the material and the gas in order to effect uniform, efficient treatment. This is especially so in treating cellulosic fiber pulp with a treatment gas, such as a gas containing ozone, during oxygen delignification of the pulp, or the like. This is most often accomplished by causing the pulp and gas to flow downwardly in a reacting vessel, and interrupting the column of pulp at various points to prevent compaction of the pulp, and to attempt to provide uniform access of the gas to the material.

According to the present invention a method and apparatus for the continuous treatment of a fibrous material with gas is provided that maximizes the uniformity and efficiency of treatment, and does so in a relatively simple manner. According to the invention, instead of the material and gas remaining continuously in contact together in a common flow path, the flows of the gas and material are separated, and then the path of the material is caused to intersect the continuous flow path of gas one or more times. Since a continuous stream of gas is utilized, maximum efficiency of the gas treatment is obtained, and due to the intersecting nature of the material and gas path intimate mixing of the gas and material, with resultant uniform treatment of the material, takes place.

According to one aspect of the method according to the invention, a porous fibrous material is treated with gas according to the following sequential continuous steps: The material is entrained with gas and passed in a first path. The material is substantially separated from the gas so that the material flows in a second path and the gas flows in a third path, distinct from the second path. The material moves in the second path so that it intersects the flow of gas in the third path at least once, with the gas passing through the material while remaining in the third path, distinct from the second path, until the desired treatment of the material with gas has been achieved. Then the material is moved in a fourth path, and the gas in a fifth path, entirely distinct from the fourth path.

Preferably the second path is a serpentine path having substantially horizontal portions interconnected by curved portions, and the third path is a substantially straight path extending downwardly, and intersecting the horizontal portions of the second path. The gas is caused to flow in the third and fifth path under the influence of a slight overpressure, and a suction device disposed in the fifth path, and the second path is preferably defined by a plurality of air-pervious conveyor belts. The material and gas are initially separated by causing them to move in a path defined by a downwardly curved upper wall and an open bottom, with a baffle disposed adjacent the bottom termination of the downwardly curved wall. The material continues to follow the wall and discharge onto one of the conveyor belts, while the gas does not tend to continue along the wall, but rather discharges into the open bottom of the separation path.

The preferred material treatment apparatus according to the invention comprises a plurality of conveying assemblies, each assembly comprising an endless air-pervious belt having a plurality of conveying projections extending outwardly therefrom, and having first and second end rollers about which the belt moves. Means are provided for mounting the rollers of each of the belts so that they are rotatable about substantially horizontal axes that are parallel to each other and are both disposed in a substantially horizontal common plane, and for mounting the assemblies vertically spaced from each other and in vertical alignment. Means are also provided for rotating the rollers of the conveying assembly so that the rollers of one assembly rotate in the opposite direction from the rollers of the vertically adjacent assembly, and further means defining a substantially vertical gas passageway through and between each assembly are provided.

It is the primary object of the present invention to provide an efficient method and apparatus for the uniform treatment of porous fibrous material with gas, particularly fluffed cellulosic fiber pulp with a gas containing ozone. This and other objects of the invention will become clear from an inspection of the detailed description of the invention, and from the appended claims.

DETAILED DESCRIPTION OF THE DRAWINGS

Figure 1:
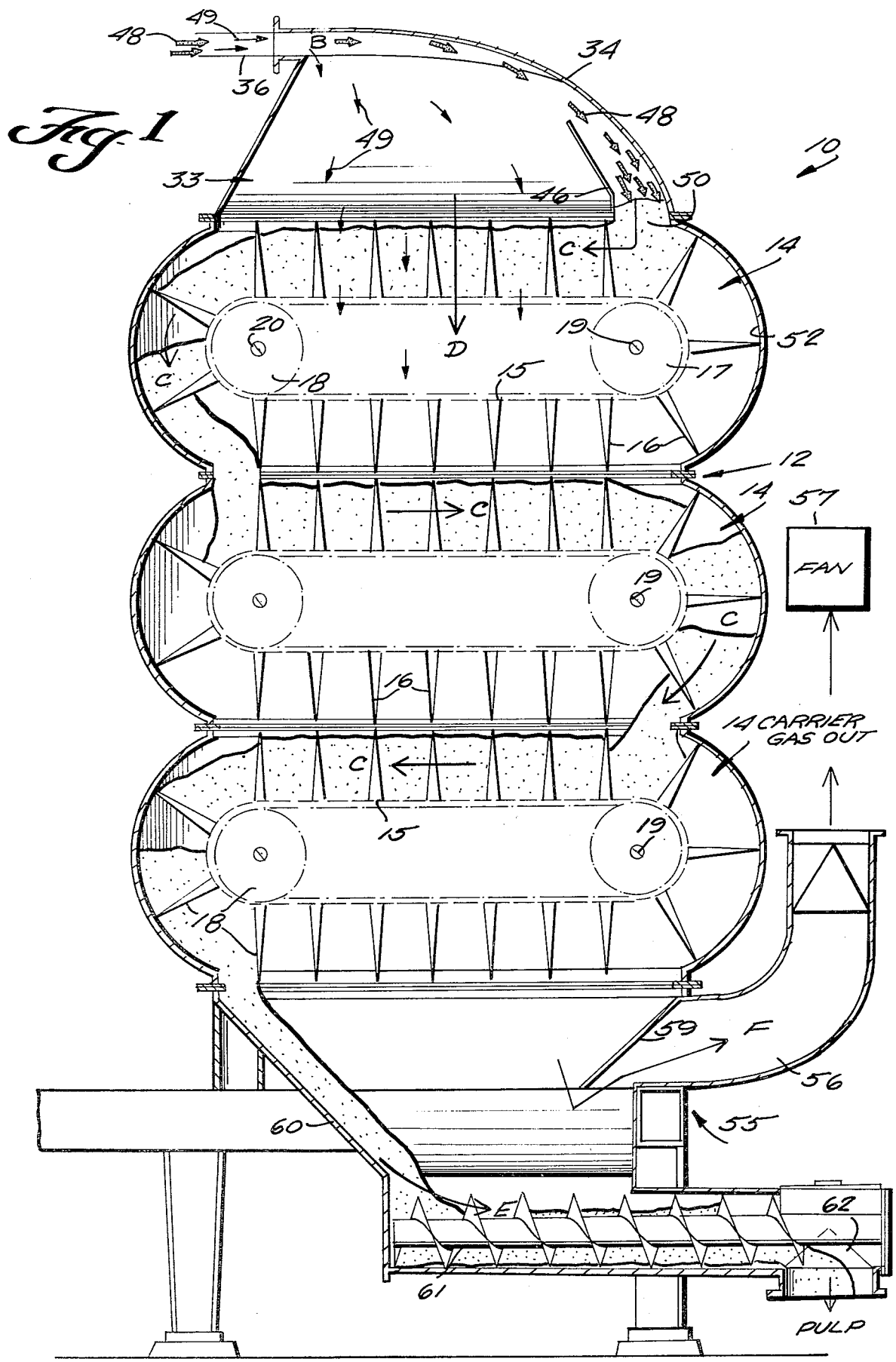
FIG. 1 is a side cross-sectional view of exemplary apparatus according to the present invention.

Exemplary apparatus for treatment of a porous, fibrous material (such as fluffed cellulosic fiber pulp) with gas (such as a gas containing ozone) is illustrated generally by reference numeral 10 in the drawings. The preferred embodiment of the apparatus 10 comprises a main treatment or reacting vessel 12 which includes one or more conveying assemblies 14. Each conveying assembly 14 comprises an endless air-pervious belt 15 having a plurality of conveying projections 16 extending outwardly therefrom. First and second end rollers 17, 18 provide for the movement of the belt 15, the rollers 17 being driven. The rollers 17, 18 are rotatably mounted by shafts 19, 20 which extend along parallel, spaced, substantially horizontal axes, the axes of the shafts 19, 20 being in a common substantially horizontal plane, as illustrated in FIG. 1.

The walls of the vessel 12, and various journals, such as journals 22 and 23 (see FIG. 2) associated therewith, mount the shafts 19, 20 in their positions, and mount the respective assemblies 14 so that they are vertically spaced from each other and in substantial vertical alignment.

Figure 2:
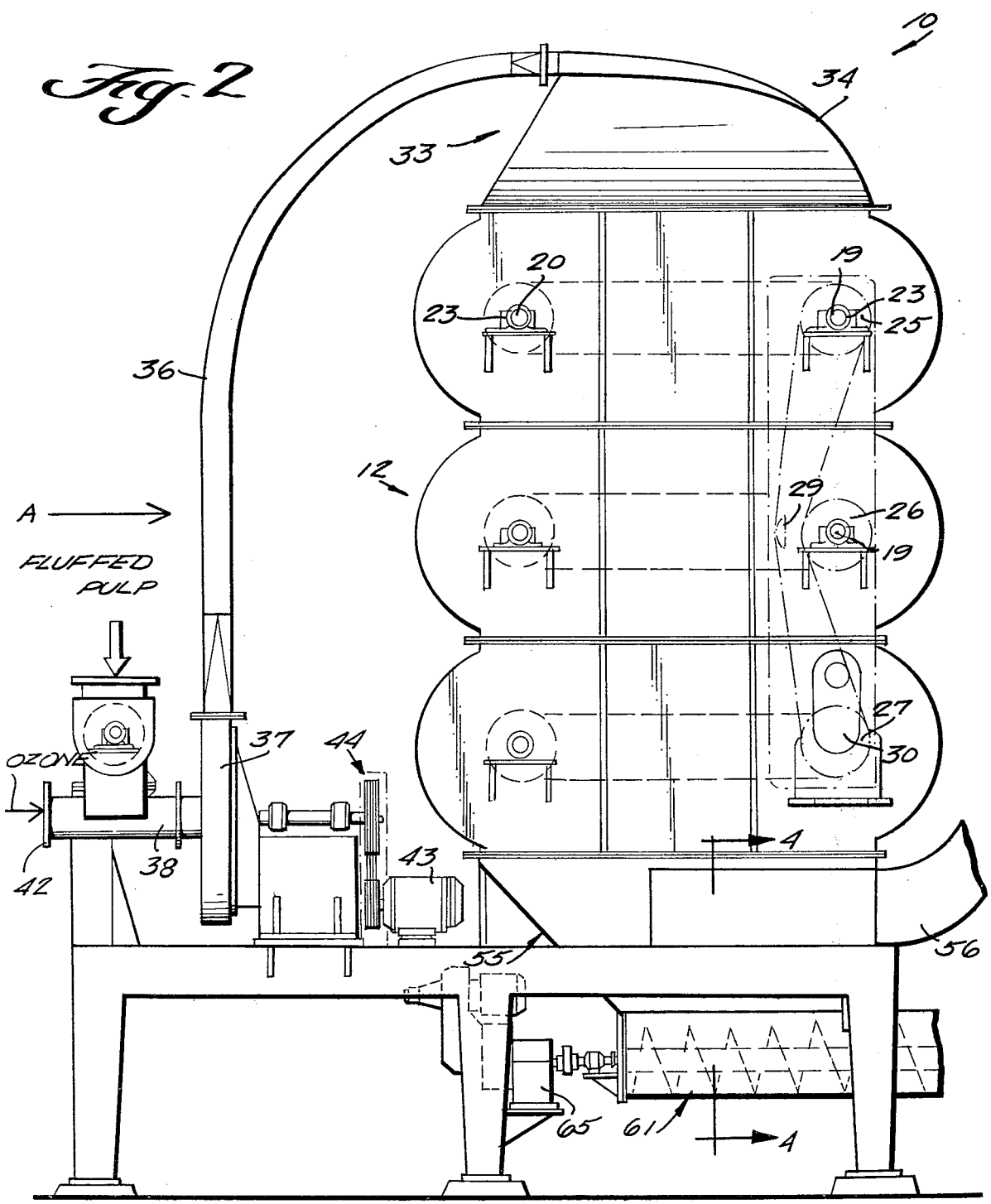
FIG. 2 is a side elevational view of the apparatus of FIG. 1, and illustrating other components with which the apparatus is associated.
Figure 3:
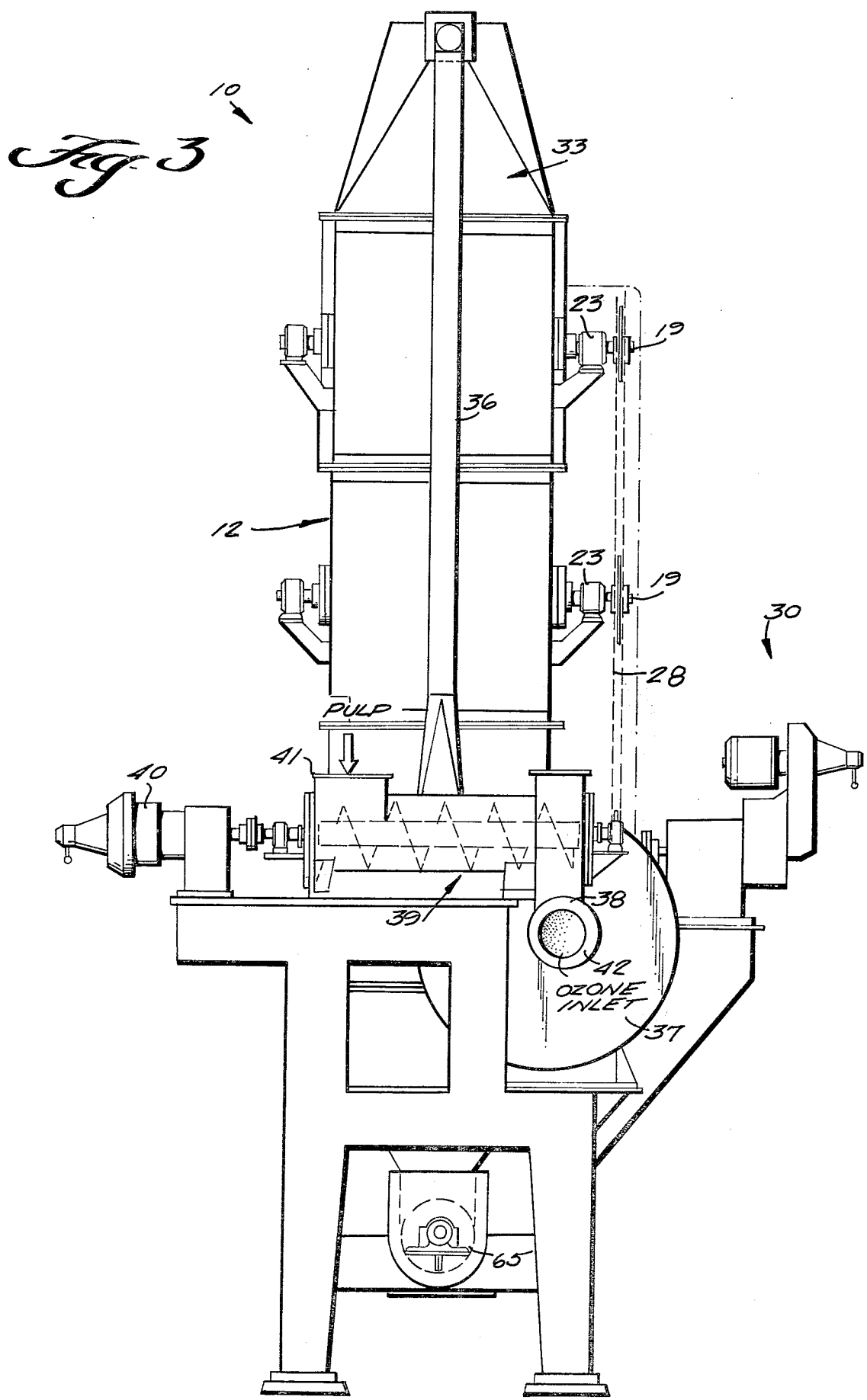
FIG. 3 is a further side view of the apparatus of FIG. 2 looking in the direction of arrow A thereof.

Means are provided for rotating the rollers 17, 18 of the assemblies 14 so that the rollers of one assembly rotate in the opposite direction from the rollers of the vertically adjacent assemblies. For instance as seen best in FIGS. 2 and 3, a sprocket 25, 26, 27 is attached to each of the shafts 19 exterior of the vessel 12, and a chain 28 interconnects the sprockets 25 through 27. Chain tensioning structures, illustrated only schematically at 29 in FIG. 2, are provided where necessary. A motor 30 is operatively connected to the bottom shaft 19, effecting rotation of the sprocket 27, and thus through the chain 28 the other sprockets 25, 26. Because of the manner in which the chain 28 is looped around the sprockets 25–27 each sprocket rotates in a different direction than the previous sprocket.

At the top of the vessel 12 a material and gas inlet structure 33 is provided. This structure includes an upper wall 34 which has a downwardly sloping curve, as seen clearly in FIGS. 1 and 2. The bottom of the structure 33 is open, and the open bottom of the structure 33 together with the walls of the vessel 12, and open interior thereof, define a substantially vertical gas passageway through and between each conveying assembly 14.

Gas entrained with material is fed to the inlet structure 33 via a conduit 36. The end of the conduit 36 opposite the inlet structure 33 is connected to a mixing fan 37. The device 37 has as an inlet thereof the conduit 38, which in turn is connected to a pulp (material) metering screw apparatus 39, driven by motor 40. A fluffed pulp inlet 41 is provided for the apparatus 39 opposite the discharge 38, and the gas (e.g. ozone) inlet 42 is in-line with the conduit 38. The mechanism 37 is driven by the motor 43 and associated drive components 44, and supplies the gas and material at a slight overpressure to the top of vessel 12.

A baffle 46 is provided adjacent the bottom termination of the upper curved wall 34 of the inlet device 33 for the vessel 12. The baffle 46 cooperates with the curved upper wall 34, and the open bottom of device 33, to provide means for substantially separating the material from the gas so that the material flows in one path, and the gas in another. Because of the angle of introduction of the material (illustrated by arrows 48 in FIG. 1) entrained in gas (illustrated by arrows 49 in FIG. 1), the curve of the wall 34, and the position of the baffle 46, the material—which has more momentum than the gas—will continue along the wall 34 until trapped by the baffle 46, ultimately discharging through discharge opening 50 onto the top of the conveyor belt 15 of the first conveying assembly 14. The gas, having less momentum than the material, will not be carried as far along the wall 34, but will have a tendency to immediately flow downwardly upon entering the inlet structure 33. Of course a small amount of material will fall to the left of the baffle 46 illustrated in FIG. 1, and a small amount of the gas will stay entrained with the material and pass through opening 50, but the majority of the gas and material will flow as indicated by arrows 48 and 49 in FIG. 1.

The walls of the vessel 12 at the ends of each of the conveying assemblies 14 are curved, being substantially disposed along a locus of points determined by the rotational path of each of the upstanding conveying portions 16. The conveying portions 16 are spaced only a small distance from the curved wall portions (e.g. see wall portion 52 in FIG. 1) of the vessel 12, or the members 16 are flexible and actually engage the interior wall 52. In any event, a substantially gas-tight seal is provided at the ends of each conveying assembly 14 so that the gas is forced to flow downwardly through the air-pervious belts 15.

Gas with entrained material is introduced into the structure 33 flowing in a first path indicated generally by B. The material is then caused to flow in a second path indicated generally by C, and the gas is caused to flow in a third path D. As illustrated in FIG. 1, the path C is preferably serpentine having horizontal portions thereof interconnected by curved portions thereof, while the path D is straight and downward.

Figure 4:
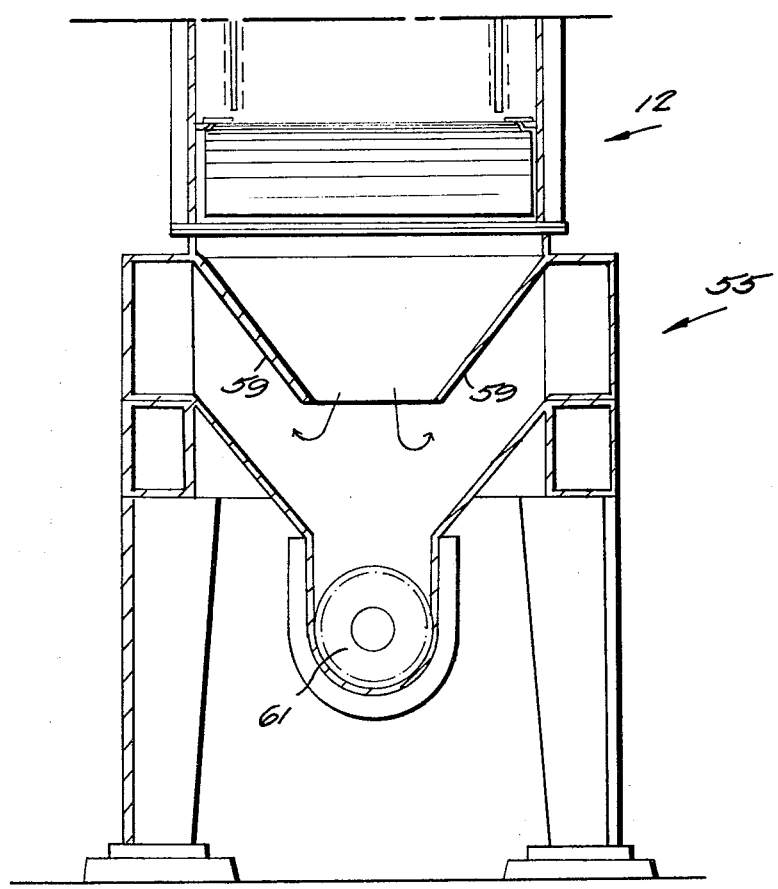
FIG. 4 is a detail cross-sectional view of the discharge portion of the apparatus of FIG. 2, the section taken along lines 4—4 thereof.

At the bottom of the vessel 12, discharge and separation sturctures—illustrated most clearly in FIGS. 1 and 4 by general reference numeral 55—are provided. Particularly, a gas discharge conduit 56 extends away from the bottom of the vessel 12, this discharge 56 being operatively connected to a suction source such as a fan 57. The fan 57 is used to secure a slight underpressure in the bottom of the reator to take care of unabsorbed ozone, if any. A baffle arrangement 59 is provided at the bottom of the vessel 12 to facilitate separation of the material and the gas. The material exits from the bottom conveying assembly 14 and has a tendency to follow downwardly sloped wall 60 of the bottom structure 55, ultimately passing to the discharge screw 61 and out the pulp outlet 62. In the structure 55, the material is thus caused to flow in a fourth path indicated generally by E, while the gas flows in a fifth path F, distinct from the fourth path E, with the fan 57 disposed in the fifth path F. The discharge screw 61 is driven by motor 65 or the like.

The conveying assemblies 14 are so arranged, and the outwardly extending conveying portions 16 so provided, that the thickness of porous fibrous materials through which the gas must flow is never too large to prevent proper gas flow. Further, the provision of the essentially gas-tight seals at the ends of each conveying assembly 14 prevents the gas from short-circuiting, so that it must pass through each horizontal portion of material in the serpentine path C. In practice, the conveyor speed would normally be in the range of 1 to 10 meters per minute, preferably about 0.5 meters per minute, which would provide for the desired treatment contact between the gas and the material.

OPERATION

The apparatus 10 is utilized to provide a method of continuously treating a porous, fibrous material such as cellulosic fiber pulp, with gas, such as a gas containing ozone. The method steps comprise: Entraining the material with gas, and passing the gas-entrained material in a first path B. Substantially separating the material from the gas in inlet structure 33 so that the material flows in a second path C, and the gas flows in a third path D, distinct from the second path C. Moving the material via the conveying assemblies 14 in the second path C so that it intersects the flow of gas in the third path D at least once, and preferably a plurality of times, with the gas passing through the material while remaining in the third path D, until the desired treatment of the material with gas has been achieved. And, utilizing separating discharge structure 55, with fan 57 and screw discharge 61, moving the material in a fourth path E, after treatment, and moving the gas in a fifth path F entirely distinct from the fourth path E.

It will thus be seen that according to the present invention a relatively simple yet efficient method and apparatus have been provided for the uniform treatment of porous fibrous material with gas. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent methods and apparatus.

What is claimed is:

1. Apparatus for continuously treating a porous, fibrous material with gas, comprising:

means for entraining the material with gas, and passing the gas-entrained material in a first path;

means for substantially separating the material from the gas so that the material flows in a second, serpentine, path, and the gas flows in a third path, distinct from the second path;

said means for moving the material in the second path comprising a plurality of air-pervious conveyor belts having conveying portions extending outwardly therefrom, with substantially horizontal portions of alternating conveyor belts moving in opposite directions; and said means defining the third path including the walls of a vertically upstanding vessel, the third path being downward and passing through said plurality of conveyor belts; and said conveying portions and vessel walls comprise a gas-seal defining means substantially preventing leakage of gas there around.

means for moving the material in the serpentine second path so that it intersects the flow of gas in the third path at least once, with the gas passing through the material while remaining in the third path, until the desired treatment of the material with gas has been achieved;

means for moving the material in a fourth path, after treatment; and means for moving the gas in a fifth path, after treatment of the material, entirely distinct from the fourth path.

2. Apparatus as recited in claim 1 wherein said gas-sealing means is located at at opposite horizontal ends of each of said conveyor belts to prevent passage of gas in any path except the third path.

3. Apparatus as recited in claim 1 or claim 2 wherein said separating means and all of said moving means are provided in an upstanding generally vertical vessel; and wherein said separating means comprises: an inlet structure to said vessel including a downwardly curved upper wall; a gas and material inlet conduit substantially horizontally introducing material entrained in gas adjacent a top portion of said downwardly curved upper wall; and open bottom; and a baffle disposed adjacent the bottom termination of the downwardly curved upper wall.

4. Apparatus as recited in claim 1 wherein said entraining means comprises a mixing mechanism, and separate means for introducing both material and gas into said mixing mechanism for passage of the material in the first path when discharged therefrom.

5. Fibrous material treatment apparatus comprising:

a plurality of conveying assemblies, each assembly comprising an endless air-pervious belt having a plurality of conveying projections extending outwardly therefrom, and having first and second end rollers about which said belt moves;

means for mounting said rollers of each of said belts so that they are rotatable about substantially horizontal axes that are parallel to each other and are both disposed in a substantially horizontal common plane, and for mounting the assemblies vertically spaced from each other and in vertical alignment;

means for rotating said rollers of said conveying assemblies so that the rollers of one assembly rotate in the opposite direction from the rollers of the vertically adjacent assembly; and means defining a substantially vertical gas passageway through and between each conveying assembly;

said means for mounting said rollers and said means defining a substantially vertical gas passageway comprising a vertically upstanding gas-tight vessel, said vessel having end walls adjacent said first and second end rollers of each of said conveying assemblies, which end walls are formed in a curve defining a locus of points corresponding to the movement of said conveying projections as they move around said first and second end rollers; and said conveying projections and said curved vessel end walls comprise gas-seal defining means substantially preventing leakage of gas therearound.

6. Apparatus as recited in claim 5 wherein said means for rotating said rollers comprise a single motor, a sprocket operatively connected to each of said first rollers; and chain means looped about said sprocket so that alternating sprockets are rotated in opposite directions.

7. Apparatus as recited in claim 5 further comprising an inlet structure to said vessel at the top thereof, said inlet structure comprising a substantially horizontally extending inlet conduit; a downwardly curved upper wall extending from said inlet conduit to a bottom termination; an open bottom; and a baffle disposed adjacent, but spaced from, the bottom termination of the downwardly curved upper wall.

8. Apparatus as recited in claim 5 further comprising a discharge apparatus at the bottom of said vessel, said discharge apparatus including a first discharge means comprising a downwardly sloping wall on a discharge structure at the bottom termination of the vessel, and a second discharge means comprising a baffle mechanism adjacent the bottom of the lowermost conveying assembly, a conduit leading from a position adjacent said baffle mechanism, and a suction device disposed in said conduit.

9. Apparatus as recited in claim 3 wherein said entraining means comprises a mixing mechanism, and separate means for introducing both material and gas into said mixing mechanism for passage of the material in the first path when discharged therefrom.

* * * * *